G. H. NOBLE.
Spinning-Spindle.
No. 224,216.  Patented Feb. 3, 1880.
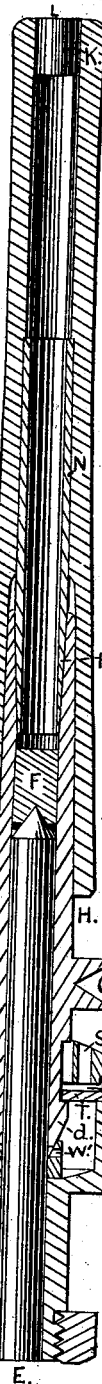
Fig. 1
Fig. 2
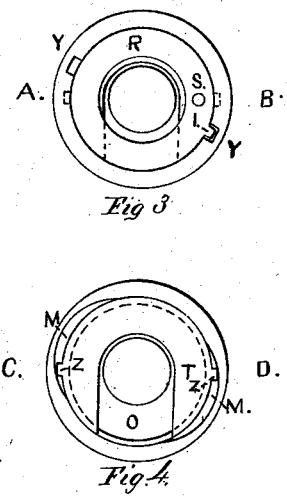
Fig. 3
Fig. 4
Witnesses.
Nathaniel Hill
Irving S. Porter.
Inventor.
George H. Noble,
By Albert M. Moore,
His Attorney.

UNITED STATES PATENT OFFICE.

GEORGE H. NOBLE, OF LOWELL, MASSACHUSETTS.

SPINNING-SPINDLE.

SPECIFICATION forming part of Letters Patent No. 224,216, dated February 3, 1880.

Application filed March 8, 1878.

*To all whom it may concern:*

Be it known that I, GEORGE H. NOBLE, of Lowell, in the county of Middlesex and Commonwealth of Massachusetts, have invented certain Improvements in Spinning-Spindles, which improvements are fully set forth in the following specification, reference being had to the accompanying drawings.

My invention consists, first, in the combination of the cover provided with a stud and an oil-hole, the lock-plate, and the shell provided with a vertical slot, to keep dust out of the step; second, in the spinning-tube, tapering upward exteriorly and downward interiorly, and provided with a whirl and bearing-plug, said tube being adapted to enter the quill and to support and rotate it by frictional contact; third, in the quill provided with a central pin to strengthen the same; fourth, in the combination, with the shell provided with horizontal and vertical slots, of the lock-plate provided with ears, and the spinning-tube provided with a shoulder, to prevent said tube from being accidentally removed in doffing.

Figure 1 is a general section of my invention. Fig. 2 represents the stud provided with oil-grooves and the step. Fig. 3 is a section on the line A B in Fig. 1, and Fig. 4 is a section on the line C D in Fig. 1.

U is a cylindrical shell, having a cylindrical shank which enters a supporting-rail, and is secured by a nut, X, on the under side of said rail. E is a round stud, imperceptibly tapered at the lower end and securely driven into and through the bottom of the shell U and its shank.

A spinning-tube, H, surrounds the stud, its lower end being conical and resting slightly on the step V. This step is flaring and surrounds the stud. One or more inlet-holes, W' W', admit the oil in the shell U into the step. A lock-plate, T, (see Fig. 4,) being almost a flat ring, but open on one side enough to admit the spinning-tube H above the shoulder d, and having two ears, Z Z, on its opposite edges, is passed onto said tube above said shoulder and turned until said ears drop into slots Y, Fig. 3, on opposite sides of the top of the shell U. The slots Y extend only partly through the sides of the shell and open into others, M M, parallel to the top of said shell, so that the plate T, being dropped into the shell and slightly turned, prevents the tube H from being raised from the stud E.

A circular cover, R, has a circular opening in the center large enough to admit the shoulder d, and has an annular flange on its under side, which fits the open top of the shell U, and has also a stud, I, on its under side, which fits either slot Y, and which stud, being placed in one of said slots, prevents the cover from turning.

The cover being lifted and turned, oil may be poured into the shell through the oil-hole S and the open side of the lock-plate T; but when the cover is replaced the oil-hole S will not be over said open side of said plate T, and there being a shoulder on the tube H at the top of said cover, filling the opening in said cover, the shell is completely covered and no dust can enter it.

The tube H is revolved by a whirl, G, and band, as the spindle in a ring-spinning machine is revolved. Above the whirl the tube H is gradually tapered to its top. A plug, F, placed about midway between the whirl and the top of the tube H, forms the upper bearing for the tube, said plug resting upon the top of the stud E, which is here conical and fits a hole of the same shape in said plug.

The tube H bears only upon the top of the stud and upon the step V, (not touching the lock-plate or the cover,) these parts centering it accurately.

To lubricate the top of the stud, the groove *a* is cut in the stud from the step V, in the direction of the revolution of the tube H, half-way around the stud and to the top of the stud, and the revolution of the tube raises the oil in this groove. The oil, when the tube H is revolved, is carried up the groove *a* so rapidly as to press between the top of the stud E and the tube H, and thereby lifts the tube, bringing the shoulder d against the lock-plate. Therefore, another groove, *b*, running from end to end of the groove *a*, is cut half around said stud in the opposite direction, and returns the surplus oil to the step V.

From the plug F the inner diameter of the tube gradually increases to the top of the tube. The inside of the bobbin or quill K tapers to fit the outside of the tube, and the quill also has a pin, N, the upper end of which is fast to the quill, and the lower end of which tapers downward and enters the top of the spinning-tube, so that the quill is very firmly held on the tube.

The pin N, if of metal, should be hollow, to secure lightness, but, if of wood, may be solid.

The stud E should be made of hardened steel, and the step V and plug F should be of such metal or alloy as will cause least friction.

The advantages of my invention are, that the quill not only embraces the tube, but the tube embraces a part of the quill; that the pin in the quill strengthens it against a crushing force, and that the pin N, being a separate piece from the quill, prevents the latter from warping in the middle, (a frequent occurrence in ordinary quills,) and that, too, even where the pin is of wood, as it is almost impossible that the grain of the wood in both pin and quill should be the same.

The grooves $a$ $b$ may be cut on the inside of the tube H.

I claim as my invention—

1. The combination of the cover R, provided with the stud I and oil-hole S, the lock-plate T, and the shell U, provided with the slots Y, as and for the purpose specified.

2. The spinning-tube H, tapering upward exteriorly and downward interiorly, and provided with a whirl, G, and bearing-plug F, said tube being adapted to enter the quill and to support and rotate it by frictional contact, substantially as described.

3. The quill K, provided with the pin N, as and for the purpose specified.

4. In combination with the shell U, provided with the slots Y M, the lock-plate T, provided with ears Z Z, and the tube H, provided with the shoulder $d$, as and for the purpose specified.

GEORGE H. NOBLE.

Witnesses:
ALBERT M. MOORE,
ALBERT HALLOWELL.